United States Patent
Lacroix et al.

(10) Patent No.: US 6,626,465 B2
(45) Date of Patent: Sep. 30, 2003

(54) FEMALE ELEMENT OF A CONNECTION AND QUICK CONNECTION INCORPORATING SUCH AN ELEMENT

(75) Inventors: Jean-Jacques Lacroix, Lovagny (FR); René Chappaz, Faverges (FR)

(73) Assignee: Staubli Faverges, Faverges (FR)

( * ) Notice: Subject to any disclaimer, the term of this patent is extended or adjusted under 35 U.S.C. 154(b) by 0 days.

(21) Appl. No.: 10/025,923

(22) Filed: Dec. 26, 2001

(65) Prior Publication Data

US 2002/0093194 A1 Jul. 18, 2002

(30) Foreign Application Priority Data

Dec. 28, 2000 (FR) ............................... 00 17235

(51) Int. Cl.$^7$ ............................................... F16L 37/00
(52) U.S. Cl. ....................... 285/80; 285/308; 285/317; 285/81
(58) Field of Search ..................... 285/80, 81, 307, 285/308, 317, 313, 82; 70/179, 207, 210

(56) References Cited

U.S. PATENT DOCUMENTS

| | | | | |
|---|---|---|---|---|
| 1,928,879 A | * | 10/1933 | Causey | 70/172 |
| 1,941,856 A | * | 1/1934 | Fraley | 285/80 |
| 2,263,293 A | | 11/1941 | Ewald | |
| 4,358,941 A | * | 11/1982 | Zimmer | 285/80 |
| 4,541,457 A | * | 9/1985 | Blenkush | 285/317 |
| 4,571,966 A | * | 2/1986 | Lopez, Jr. | 70/232 |
| 4,703,958 A | | 11/1987 | Fremy | |
| 4,863,201 A | * | 9/1989 | Carstens | 285/317 |
| 5,066,049 A | * | 11/1991 | Staples | 285/80 |
| 5,462,316 A | * | 10/1995 | Street et al. | 285/81 |
| 5,695,223 A | | 12/1997 | Boticki | |
| 6,089,540 A | | 7/2000 | Heinrichs et al. | |

* cited by examiner

Primary Examiner—David Bochna
(74) Attorney, Agent, or Firm—Dowell & Dowell, P.C.

(57) ABSTRACT

A female element of a quick connection for removably joining two pipes through which a fluid passes wherein the element includes a body defining a housing for receiving a portion of a male endpiece. A retaining device is operable to selectively retain the endpiece in fitted configuration in the female element and includes a push-button which carries a lock for selectively locking the endpiece in the housing or for preventing the introduction of the endpiece in the housing.

10 Claims, 5 Drawing Sheets

FEMALE ELEMENT OF A CONNECTION AND QUICK CONNECTION INCORPORATING SUCH AN ELEMENT

BACKGROUND OF THE INVENTION

1. Field of the Invention

The present invention relates to a female element of a quick connection and to a quick connection incorporating such an element.

2. Description of the Related Art

In the domain of the removable join of pipes through which a fluid passes, it is known to use a female connecting element which comprises controlled means for locking a male endpiece in a configuration fitted in the female element, i.e. with the pipes in connected configuration. The locking means may, in certain cases, be controlled by a sleeve mobile in a direction parallel to the axis of the female element. The locking elements may also be controlled by a press-button mobile in a direction substantially perpendicular to that axis, the user depressing the button when it is necessary to clear the passage for the male connection when it is to be extracted from the female element.

The present invention is applicable to this second particular type of female connecting elements, starting from the observation that it is sometimes necessary to prevent connection or disconnection of the male and female elements of a connection. This is particularly the case when safety imperatives, associated with the nature of the fluid transiting through the connection, impose a limitation of the risks of false manoeuvre. It is sometimes necessary to provide that only authorized staff can proceed with the connection or disconnection of the male and female elements of a connection, for example in the medical domain or when dangerous fluids are to be manipulated. In certain applications, the connectors may also have to be secured against the risks of theft of the fluid that they allow to circulate.

Up to the present time, it is not possible to secure such a connection efficiently.

It is a more particular object of the present invention to overcome these drawbacks.

SUMMARY OF THE INVENTION

To that end, the present invention relates to a female connecting element of the afore-mentioned type, i.e. comprising a press-button for controlling means for locking a male endpiece, which is characterized in that the button bears controlled means for selectively blocking the locking means in a configuration where a part of an endpiece is retained and/or in a configuration opposing the introduction of a part of an endpiece.

Thanks to the invention, it is possible to immobilize the button, with respect to the normal location of the endpiece in the female element, in a position where it blocks, thanks to the locking means, passage for the male endpiece, which avoids untimely connections and disconnections, while the overall dimensions of the connection are not increased to a substantial degree. The additional safety obtained by the blockage of the button is operational both when the connection is closed, in which case this blockage prevents the connection from opening, and when the connection is open, in which case such blockage prevents closure of the connection.

According to advantageous aspects, a female connecting element according to the invention incorporates one or more of the following characteristics:

The button defines a volume for receiving a part of an endpiece, this button being provided with at least one inner element in relief adapted to cooperate with at least one outer element in relief of the endpiece in order to lock it in fitted configuration, while the button is adapted to control a movement of relative moving apart of these relief elements and the blocking means may immobilize the endpiece in the housing, with the result that it is impossible to move apart these inner and outer relief elements. Thanks to this aspect of the invention, a displacement of the button does not make it possible to release the male endpiece. In a variant, the blocking means may be provided to be able to immobilize the button in a position where it is impossible to move apart the afore-mentioned relief elements. In that case, the button, blocked in its afore-mentioned position, prevents the outer relief element of the endpiece from moving apart from the inner relief element of the button, with the result that the endpiece is immobilized with respect to the button. Whatever the variant, means for elastically loading the button towards a position of engagement of its inner relief element with the outer relief element of an endpiece, may be provided.

The button is equipped with a bolt controlled by a lock.

In a first embodiment of the invention, this bolt is mobile in a direction substantially parallel to the direction of displacement of the button with respect to the body, this bolt being adapted to exert on a male endpiece an effort of hold of the endpiece in position of engagement of an outer relief element of the endpiece with an inner relief element of the female element. In that case, the button advantageously defines a housing in which an endpiece may be introduced, with the possibility of transverse movements with respect to a longitudinal axis of the female element, this bolt being adapted to prevent the transverse movements of an endpiece in this housing.

In another advantageous embodiment, the bolt is mobile in a direction substantially perpendicular to the direction of displacement of the button with respect to the body, between a first position where it does not interfere with the body, and a second position where it projects radially with respect to the button and may come into abutment against the body, limiting a displacement of the button in a radial direction with respect to the longitudinal axis of the female element.

Whatever the embodiment of the invention, the lock may be a cylinder lock completely integrated in the button and provided with means for obturating by default the hole in which a key is introduced in the lock. In this way, the overall dimensions of the button are not substantially modified with respect to the button of the connections of the prior art, with the result that the overall dimensions of the connection remain virtually unchanged.

The invention also relates to a quick connection for removably joining two pipes, which comprises a male endpiece and a female element as described hereinbefore. Such a connection is more secure than the prior art connections, while it remains easy to use for staff authorized to manipulate the means for blocking the button.

BRIEF DESCRIPTION OF THE DRAWINGS

The invention will be more readily understood on reading the following description of two forms of embodiment of a quick connection in accordance with its principle, given solely by way of non-limiting example, with reference to the accompanying drawings, in which.

DESCRIPTION OF PREFERRED EMBODIMENTS

Figure 1:
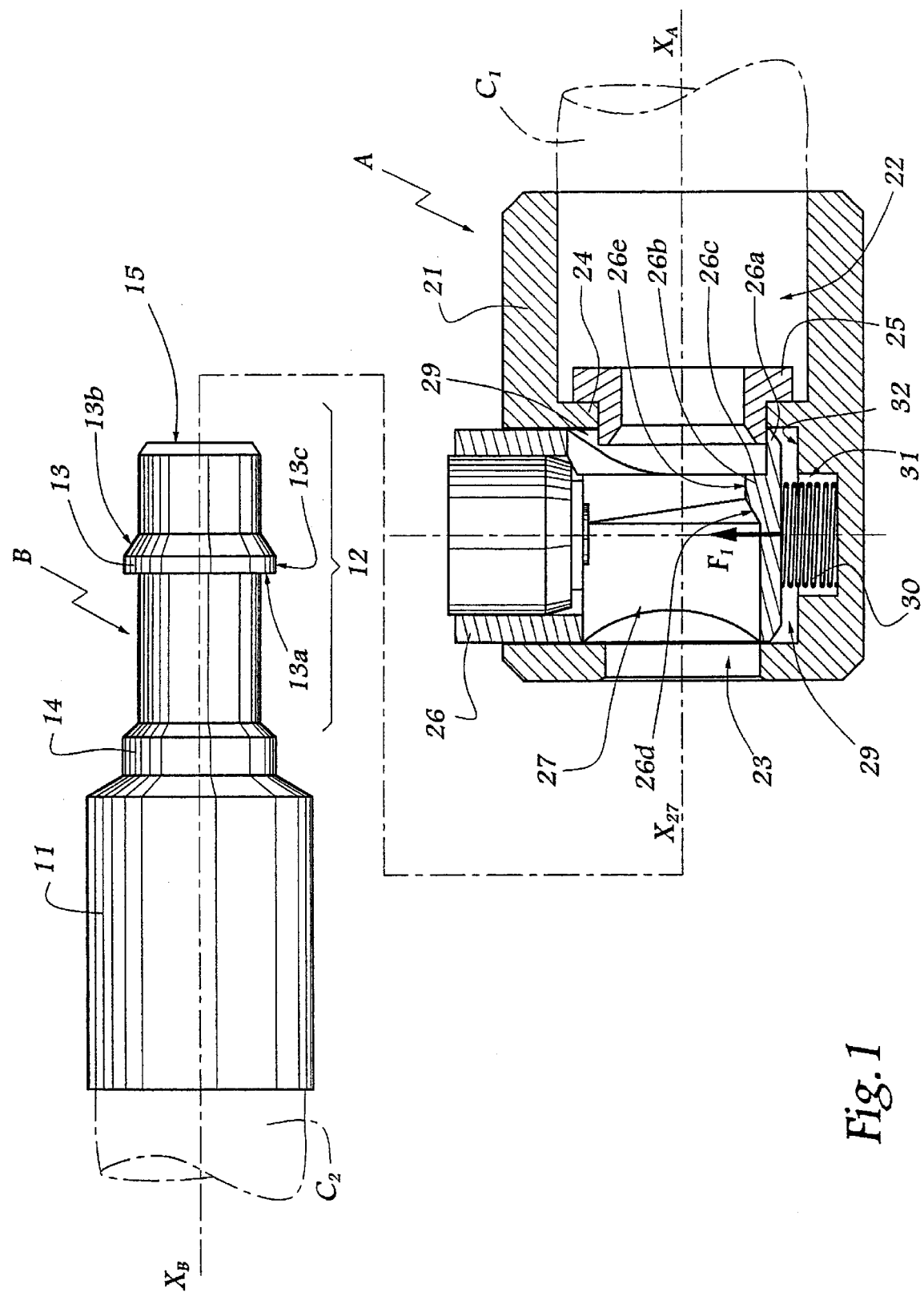
FIG. 1 schematically shows a quick connection according to the invention before its male and female elements have been joined, the female element being shown in section, while the male endpiece is shown in outside view.

Referring now to the drawings, a quick connection shown in the Figures comprises a female element A and a male endpiece B provided to fit in each other. The rear part of the female element A is connected fluidically to a pipe $C_1$. Similarly, the rear part of the endpiece B is connected to a second pipe $C_2$. By way of example, it may be considered that pipe $C_1$ is fixed while pipe $C_2$ is fast with an apparatus or a system forming part of a series of apparatus or systems that may be successively connected on pipe $C_1$. In that case, the female element A is intended to cooperate successively with different male endpieces B.

The geometry of the endpiece B is conventional. This endpiece comprises a first tubular part 11 on which the pipe $C_2$ is connected, this first part extending in a second part 12, of smaller diameter, comprising a flange 13 and joined to part 11 by a section of transition 14.

15 denotes the front end of the endpiece B, i.e. the end of part 12 opposite the section 14.

The flange 13 is defined between an annular surface 13a substantially perpendicular to the longitudinal axis $X_B$ of the endpiece B and a truncated surface 13b which converges in the direction of end 15. A cylindrical radial surface 13c joins the surfaces 13a and 13b of the flange 13.

The female element A comprises a substantially tubular principal body 21 on which the pipe $C_1$ is connected. $X_A$ denotes the longitudinal axis of the element A. The body 21 is hollow and defines a housing 22 for receiving the endpiece B and for circulation of fluid, which makes it possible to join pipes C, and $C_2$. The body 21 is provided with an opening 23 of circular cross-section centred on the axis $X_A$. The body 21 also defines a bearing surface 24 for a ring 25 equipped with O-rings (not shown) to ensure seal, on the one hand, with endpiece B and, on the other hand, with the bearing surface 24.

A device for retaining the endpiece B in the element A is provided and comprises a press-button 26 disposed in a part of the housing 22 and forming a housing 27 for receiving the part 12. The button 26 is disposed in a bore 29 made in the body 21, in the direction of an axis $Y_A$ perpendicular to axis $X_A$, i.e. radial with respect thereto. The respective dimensions of the bore 29 and of the button 26 are such that this button can slide along axis $Y_A$ with respect to the body 21. A spring 30 is arranged in a housing 31 provided in the bottom 32 of the bore 29 and exerts on the button 26 an elastic effort F, tending to push it upwardly in FIG. 1, i.e. to drive it from the bore 29. The button 26 comprises an extension 26a which comes into abutment against the ring 25 under the effect of the effort $F_1$, in order to limit the movement of extraction of the button 26 with respect to the bore 29.

When the endpiece B is introduced in the housing 22, its part 12 traverses the housing 27 and the flange 13 is disposed between the ring 25 and an inner flange 26b of the button 26. In practice, the flange 26b extends only over the lower part of the inner periphery of the housing 27. The configuration is in that case that of FIG. 2 where the endpiece B is retained in position in the element A by the cooperation of the flanges 13 and 26b.

More precisely, the flange 26b is defined between an annular surface 26c, substantially perpendicular to a central axis $X_{27}$ of the housing 27, and a truncated surface 26d converging in the direction of the ring 25. A cylindrical surface 26e joins the surfaces 26c and 26d.

The surface bearing of the surfaces 26c and 13a allows an efficient locking of the endpiece B in the female element A.

Figure 3:
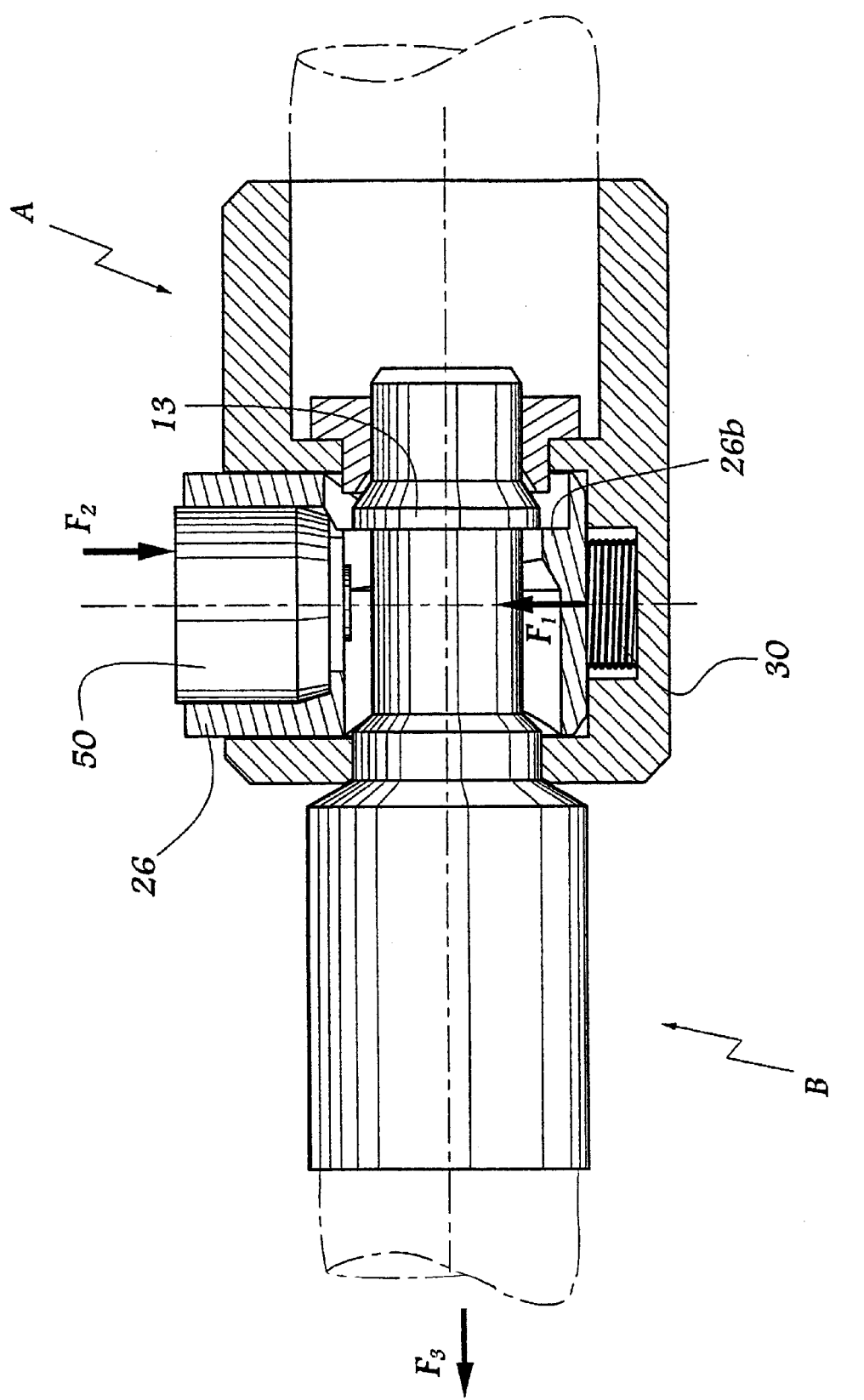
FIG. 3 is a view similar to FIG. 1 when the male endpiece is extracted from the female element.

When the endpiece B is to be released, it suffices to exert on the button 26 an effort, represented by arrow $F_2$ in FIG. 3, this effort having the effect of displacing the button 26 against the effort F, exerted by the spring 30. This disengages the flange 26b from the path of the flange 13 during extraction of the endpiece B which is represented by arrow $F_3$ in FIG. 3.

According to the invention, a cylinder lock 50 is integrated in the button 26 and controls a bolt 51 which may or may not project towards the bottom 32 of the bore 29 depending on the state of the lock included in the cylinder 50, this lock being controlled with the aid of a key 52.

Figure 2:
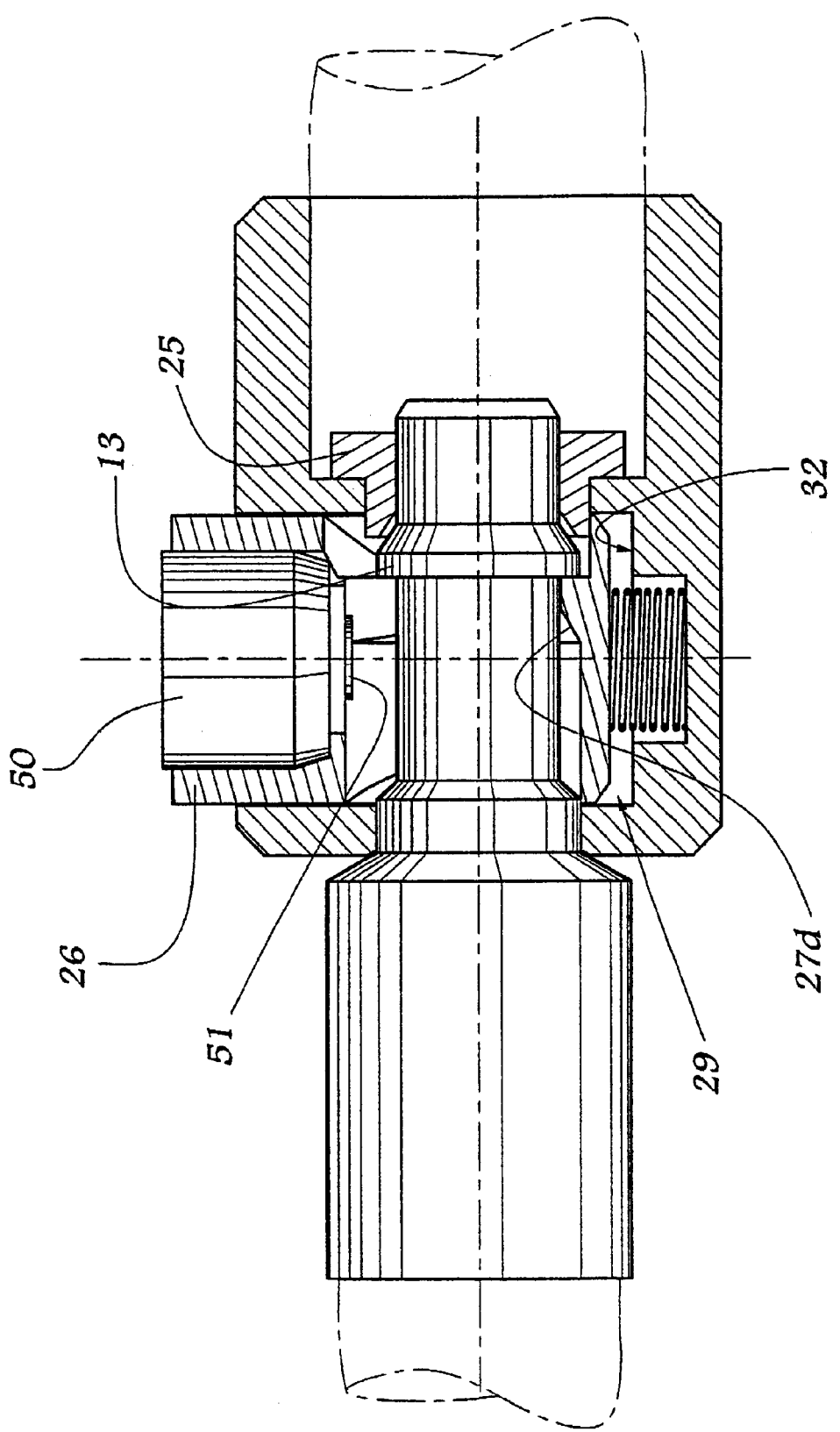
FIG. 2 is a view similar to FIG. 1 while the male and female elements are coupled.

When the bolt 51 does not project out of the cylinder 50, the configuration is that of FIGS. 1 to 3 where the male endpiece B can be introduced into the female element A or extracted therefrom.

Figure 4:
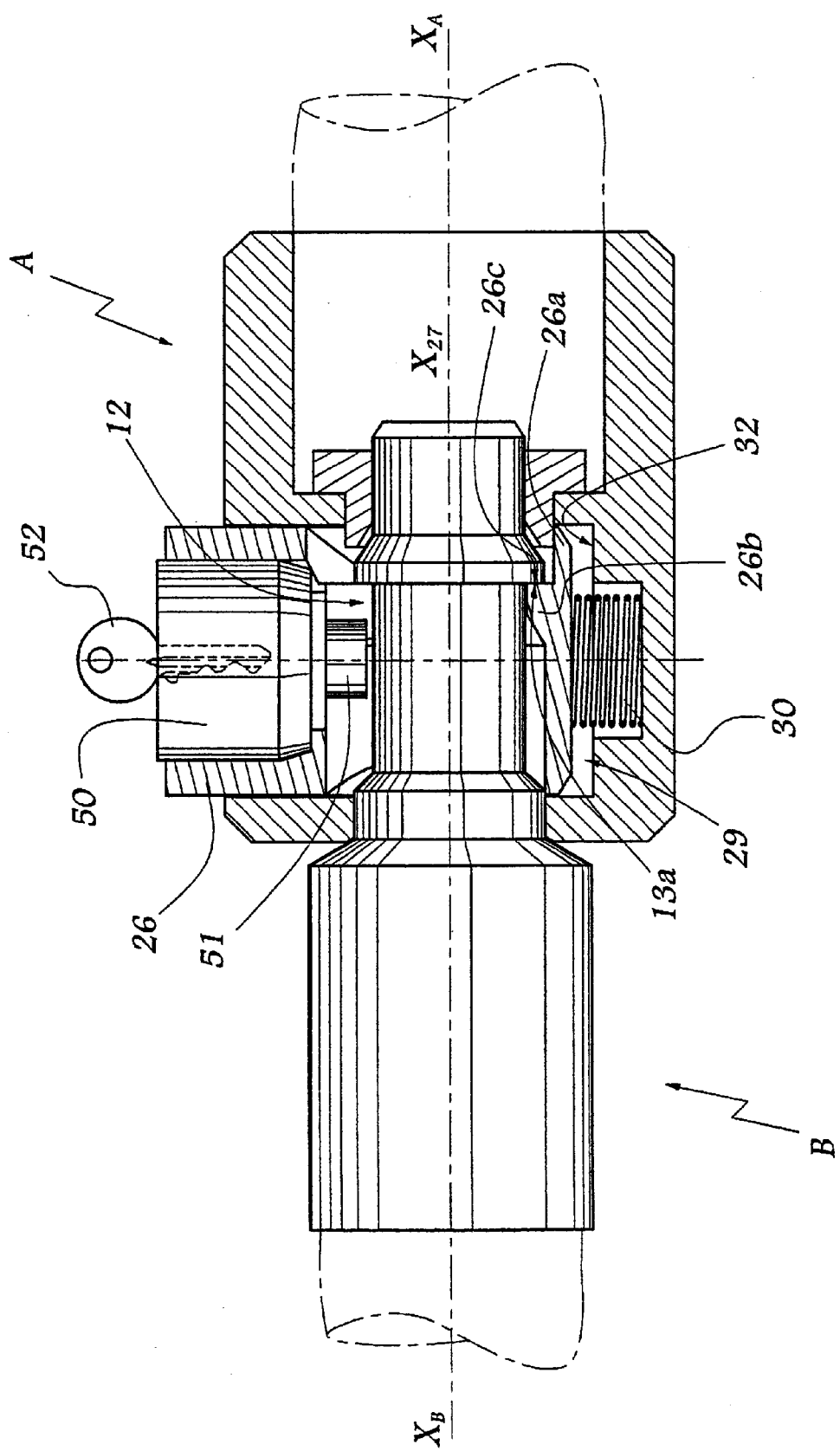
FIG. 4 is a view similar to FIG. 1 when the male endpiece cannot be extracted from the female element.

When the connection formed by elements A and B is to be locked in configuration of connection of the pipes $C_1$ and $C_2$, the key 52 is introduced in the cylinder 50 to manoeuvre the bolt 51 which then reaches the position of FIG. 4 where it prevents an offset of axes $X_B$ and $X_{27}$ which in that case substantially merge. In effect, an effort $F_2$ exerted on the button 26 in the configuration of FIG. 4 has the effect of displacing the button 26 against the effort $F_1$, exerted by the spring 30 but the flange 26b cannot be offset with respect to the flange 13 as the bolt 51 prevents the transverse movements of the button 26 in the bore 29 in direction $Y_A$. In other words, the bolt 51 ensures that the flanges 13 and 26b remain in abutment against each other, which prevents any untimely extraction of the endpiece B with respect to the female element A.

The bolt 51 also makes it possible to prevent an untimely connection of elements A and B insofar as, if the cylinder 50 is manoeuvred in the configuration of FIG. 1 to cause the bolt 51 to project towards the bottom 32 of the bore 29, the bolt 51 opposes the passage of the flange 13 at the level of flange 26b. In this way, when it is attempted to introduce the part 12 in the housings 27 and 22, the button cannot be shifted in the bore 29 towards the bottom 32, as is the case when the bolt is retracted in the cylinder 50.

Figure 5:
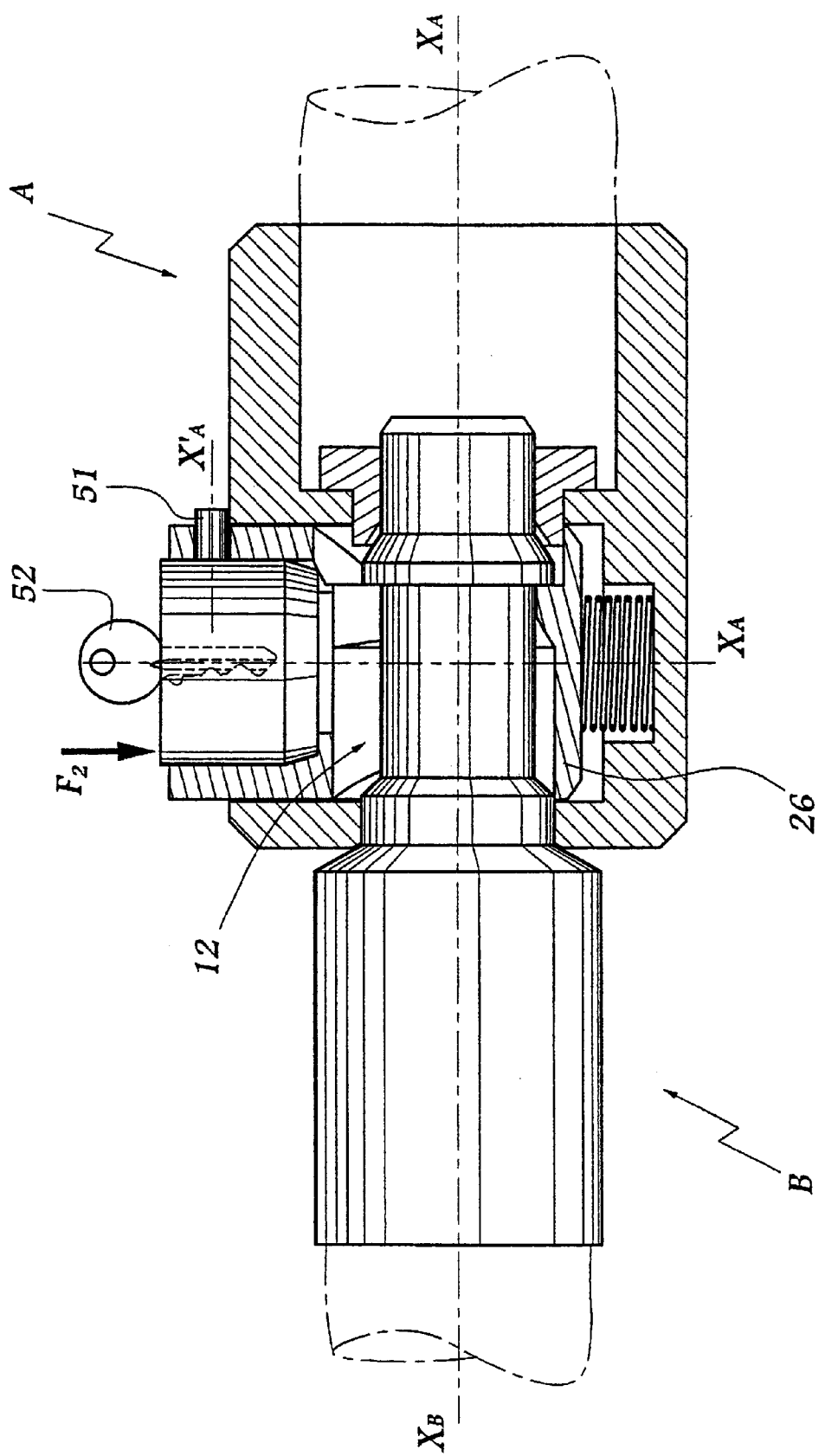
FIG. 5 is a view similar to FIG. 4 for a device according to a second form of embodiment of the invention.

In the second form of embodiment of the invention shown in FIG. 5, elements similar to those of the first embodiment bear identical references. This embodiment differs from the preceding one in that the bolt 51 here is controlled by the cylinder 50 to project, or not project, radially with respect to the button 26, i.e. in a direction $X'_A$ substantially perpendicular to direction $Y_A$ of slide of the button 26 in the bore 29.

The direction $X'_A$ may or may not be parallel to direction $X_A$.

When the bolt 51 projects, as shown in FIG. 5, it prevents an effort $F_2$ exerted on the button 26 from allowing it to be displaced towards the bottom 32 of the bore 29, with the result that the part 12 of the male endpiece B remains immobilized in the female element A.

This mode of blocking the button 26 also prevents an untimely connection of elements A and B.

As shown in the accompanying Figures, the integration of a cylinder 50 in a button 26 of a connection according to the invention does not substantially modify the dimensions of this button, which is particularly advantageous from the standpoint of manoeuvrability of the connections according to the invention.

Taking into account the environment in which a connection according to the invention is likely to be used, the cylinder 50 is advantageously protected from outside pollution by means obturating the hole in which the key 52 is introduced. Such means may comprise a sliding or pivoting member which moves aside from the hole in question when the key is introduced.

The invention has been shown with a button 26 in one piece. However, it is applicable with a button formed by a plurality of assembled pieces.

The invention is not limited to a device comprising a lock controlled by a key. It is also applicable to a lock with remote-control or with a system of combinations.

What is claimed is:

1. A female element of a quick connect coupling for removably joining two pipes through which a fluid passes, said element comprising; a body defining a housing for receiving an endpiece of a male element, retaining means for retaining the endpiece in fitted configuration in said female element, said retaining means being controlled by a push button movable with respect to said body in a direction of displacement which is substantially radial with respect to a longitudinal axis of said female element from a first position wherein said retaining means retains the endpiece within said housing to a second position wherein said retaining means is moved to permit release of the endpiece from said housing, and lock means carried by said push button for selectively preventing said push button from moving to said second position when the endpiece is inserted within said housing and retained by said retaining means.

2. The female element of claim 1, wherein said push button forms a housing for receiving a portion of the endpiece; said retaining means being formed with said push button and being in a form of at least one inner element in relief which is adapted to cooperate with at least one outer element in relief of the endpiece for retaining said endpiece in fitted configuration in said female element.

3. The female element of claim 2, including resilient means for urging said push button towards said first position.

4. The female element of claim 1, wherein said lock means is carried by said push button and is equipped with a lock bolt.

5. The female element of claim 4, wherein said bolt is movable from a first position wherein the endpiece may be inserted and withdrawn from said housing to a second position by being extended in a direction substantially parallel to the direction of displacement of said push button with respect to said body, said bolt being adapted, when in the second position thereof, to exert on a male endpiece a force on the endpiece when the endpiece is positioned within said housing to thereby prevent said retaining means from being movable to said second position thereof.

6. The female element of claim 5, wherein said push button defines a housing in which the endpiece may be introduced, and said bolt being adapted to prevent introduction of the endpiece in said housing of said push button and said housing of said body when said bolt is in said second position thereof.

7. The female element of claim 4, wherein said bolt is movable in a direction substantially perpendicular to the direction of displacement of said push button with respect to said body, between a first position spaced from said body and a second position abutting against said body, thereby preventing a displacement of said push button in said direction of displacement.

8. The female element for claim 4, wherein said lock means is a cylinder lock integrated in said push button and provided with means for obturating a keyhole in said cylinder lock.

9. Quick connection for removably joining two pipes, comprising; a male element and a female element, said female element including a body defining a housing for receiving an endpiece of said element, retaining means for retaining the endpiece in fitted configuration in said female element, said retaining means being controlled by a push button movable with respect to said body in a direction of displacement which is substantially radial with respect to a longitudinal axis of said female element from a first position wherein said retaining means retains the endpiece within said housing to a second position wherein said retaining means is moved to permit release of the endpiece from said housing, and lock means carried by said push button for selectively preventing said push button from moving to said second portion.

10. A female element of a quick connect coupling for removably joining two pipes through which a fluid passes, said element comprising; a body defining a housing for selectively receiving an endpiece of a male element, retaining means for retaining the endpiece in fitted configuration in said female element when said male element is inserted within said housing, said retaining means being controlled by a push button movable with respect to the said body in a direction of displacement which is substantially radial with respect to a longitudinal axis of said female element from a first position wherein said retaining means is adapted to retain the endpiece within said housing to a second position wherein said retaining means is adapted to be moved to permit release of the endpiece from said housing, and lock means carried by said push button including a selectively extendable member which, when extended, blocks an insertion of the endpiece within said housing thereby preventing a connection between said male element and said female element.

* * * * *